(12) United States Patent
Daniel et al.

(10) Patent No.: US 10,530,408 B2
(45) Date of Patent: *Jan. 7, 2020

(54) REDUCING OUT-OF-CHANNEL NOISE IN A WIRELESS DISTRIBUTION SYSTEM (WDS)

(71) Applicant: Corning Optical Communications LLC, Charlotte, NC (US)

(72) Inventors: Moshe Daniel, Gedera (IL); Roi Yosy Ziv, Ramat Gan (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,688

(22) Filed: Feb. 13, 2019

(65) Prior Publication Data
US 2019/0181898 A1 Jun. 13, 2019

Related U.S. Application Data

(63) Continuation of application No. 15/086,861, filed on Mar. 31, 2016, now Pat. No. 10,236,924.

(51) Int. Cl.
*H04B 1/12* (2006.01)
*H04B 1/10* (2006.01)

(52) U.S. Cl.
CPC ....... *H04B 1/12* (2013.01); *H04B 2001/1045* (2013.01)

(58) Field of Classification Search
None
See application file for complete search history.

(56) References Cited

U.S. PATENT DOCUMENTS

| 6,307,669 B1 | 10/2001 | Flood et al. |
| 6,459,526 B1 * | 10/2002 | Minelly ............... H01S 3/06754 359/337.1 |

(Continued)

FOREIGN PATENT DOCUMENTS

| EP | 3166231 A1 * | 5/2017 | ........... H04B 17/309 |
| EP | 3166231 A1 | 5/2017 | |

(Continued)

*Primary Examiner* — Berhanu Tadese
(74) *Attorney, Agent, or Firm* — C. Keith Montgomery

(57) ABSTRACT

Embodiments of the disclosure relate to reducing out-of-channel noise in a wireless distribution system (WDS). A digital filter in a remote unit is configured to suppress out-of-channel noise in a downlink digital communications signal based on at least one filter configuration parameter received from a control circuit. The control circuit is configured to determine the filter configuration parameter based on physical characteristics of the downlink digital communications signal. By suppressing the out-of-channel noise of the downlink digital communications signal, it is possible to provide a downlink RF communications signal communicated from the remote unit that complies with a spectrum emission mask (SEM). Further, by suppressing the out-of-channel noise at the remote unit, it is not necessary for a central unit to perform digital filtering before distributing the downlink digital communications signal to the remote unit, thus helping reduce complexity, cost, physical size, and power consumption of the central unit.

27 Claims, 9 Drawing Sheets

(56) References Cited

U.S. PATENT DOCUMENTS

| | | | | |
|---|---|---|---|---|
| 6,529,715 B1* | 3/2003 | Kitko | H03F 1/486 | 330/124 R |
| 6,587,514 B1* | 7/2003 | Wright | H03F 1/3241 | 330/149 |
| 6,807,188 B1* | 10/2004 | Blahut | H04J 3/0682 | 348/E7.07 |
| 8,290,447 B2* | 10/2012 | Sutton | H04B 1/0475 | 455/165.1 |
| 8,982,995 B1* | 3/2015 | Van Cai | H04B 1/0475 | 375/297 |
| 9,246,721 B1* | 1/2016 | Martinez | H04B 1/0007 | |
| 9,247,543 B2* | 1/2016 | Berlin | H04W 72/0453 | |
| 9,385,763 B1* | 7/2016 | Shi | H04B 1/1036 | |
| 9,455,760 B1* | 9/2016 | Dick | H03F 1/3247 | |
| 9,807,700 B2* | 10/2017 | Harel | H04W 52/243 | |
| 9,826,537 B2* | 11/2017 | Forenza | H04B 17/318 | |
| 9,859,947 B2* | 1/2018 | Lee | H04B 1/62 | |
| 9,860,048 B2* | 1/2018 | Lim | H04L 5/001 | |
| 9,967,754 B2* | 5/2018 | Berlin | H04W 72/0453 | |
| 10,090,985 B2* | 10/2018 | Lim | H04L 5/001 | |
| 10,123,285 B2* | 11/2018 | Lim | H04W 52/383 | |
| 10,178,632 B2* | 1/2019 | Loehr | H04W 4/70 | |
| 10,236,924 B2* | 3/2019 | Daniel | H04B 1/0475 | |
| 10,244,489 B2* | 3/2019 | Loehr | H04W 52/34 | |
| 2002/0191710 A1* | 12/2002 | Jeckeln | H03F 1/3247 | 375/296 |
| 2003/0216129 A1* | 11/2003 | Khalil | H04B 1/28 | 455/197.2 |
| 2004/0252786 A1* | 12/2004 | McHenry | H03F 1/3229 | 375/297 |
| 2007/0030065 A1* | 2/2007 | Heinikoski | H03F 1/3241 | 330/149 |
| 2007/0254592 A1* | 11/2007 | McCallister | H03F 1/0205 | 455/67.11 |
| 2009/0274073 A1* | 11/2009 | Sutton | H04L 5/0066 | 370/280 |
| 2010/0131214 A1* | 5/2010 | Seely | G01R 31/30 | 702/58 |
| 2010/0216473 A1* | 8/2010 | Kazmi | H04W 52/386 | 455/436 |
| 2010/0227575 A1 | 9/2010 | Rofougaran et al. | | |
| 2011/0032879 A1* | 2/2011 | Beaudin | H04B 7/15542 | 370/328 |
| 2011/0051906 A1* | 3/2011 | Cioffi | H04B 3/32 | 379/32.04 |
| 2011/0130163 A1* | 6/2011 | Saban | H04W 88/085 | 455/517 |
| 2011/0158081 A1* | 6/2011 | Wang | H03F 1/304 | 370/201 |
| 2011/0201269 A1* | 8/2011 | Hobbs | H04B 7/15535 | 455/9 |
| 2012/0052892 A1* | 3/2012 | Braithwaite | H04B 1/525 | 455/501 |
| 2012/0155572 A1* | 6/2012 | Kim | H03F 1/3247 | 375/297 |
| 2012/0231784 A1* | 9/2012 | Kazmi | H04B 1/3838 | 455/423 |
| 2012/0281565 A1* | 11/2012 | Sauer | H04W 64/00 | 370/252 |
| 2012/0329523 A1* | 12/2012 | Stewart | H03F 1/3247 | 455/562.1 |
| 2013/0051261 A1* | 2/2013 | Kazmi | H04B 7/0693 | 370/252 |
| 2013/0107926 A1* | 5/2013 | Xia | H03G 3/3042 | 375/224 |
| 2013/0212640 A1* | 8/2013 | White | G06F 21/32 | 726/1 |
| 2013/0272202 A1* | 10/2013 | Stapleton | H03F 1/3247 | 370/328 |
| 2013/0308693 A1* | 11/2013 | Li | H04W 24/02 | 375/224 |
| 2013/0336370 A1* | 12/2013 | Jovanovic | H04L 25/03019 | 375/214 |
| 2014/0031031 A1* | 1/2014 | Gauvreau | H04L 5/0053 | 455/426.1 |
| 2014/0037292 A1* | 2/2014 | Stapleton | H04B 10/27 | 398/68 |
| 2014/0204867 A1* | 7/2014 | Lim | H04W 72/0413 | 370/329 |
| 2014/0269502 A1* | 9/2014 | Forenza | H04B 17/12 | 370/328 |
| 2014/0341315 A1* | 11/2014 | Cova | H04B 1/0475 | 375/296 |
| 2014/0378180 A1* | 12/2014 | Schwent | H04W 52/241 | 455/522 |
| 2015/0011233 A1* | 1/2015 | Kazmi | H04W 16/14 | 455/454 |
| 2015/0055580 A1* | 2/2015 | Lim | H04W 52/243 | 370/329 |
| 2015/0061762 A1* | 3/2015 | Charlon | H03F 1/3258 | 330/149 |
| 2015/0063323 A1* | 3/2015 | Sadek | H04W 72/1215 | 370/336 |
| 2015/0087352 A1* | 3/2015 | Lim | H04W 72/0453 | 455/522 |
| 2015/0171878 A1* | 6/2015 | Schafferer | H03M 1/74 | 375/297 |
| 2015/0181517 A1* | 6/2015 | Lee | H04W 52/146 | 370/311 |
| 2015/0195795 A1* | 7/2015 | Loehr | H04W 52/06 | 455/522 |
| 2015/0229386 A1* | 8/2015 | Lange | H04B 7/15507 | 370/317 |
| 2015/0244430 A1* | 8/2015 | Shattil | H04B 1/0003 | 370/254 |
| 2015/0245302 A1* | 8/2015 | Lim | H04W 52/34 | 455/522 |
| 2015/0270882 A1* | 9/2015 | Shattil | H04B 1/0003 | 370/329 |
| 2015/0289255 A1* | 10/2015 | Lim | H04W 72/0413 | 370/329 |
| 2015/0303950 A1* | 10/2015 | Shattil | H04B 1/0003 | 370/328 |
| 2016/0088569 A1* | 3/2016 | Frank | H04W 52/146 | 455/522 |
| 2016/0094318 A1* | 3/2016 | Shattil | H04B 7/026 | 375/267 |
| 2016/0134325 A1* | 5/2016 | Tageman | H04B 1/525 | 455/83 |
| 2016/0242128 A1* | 8/2016 | Loehr | H04W 76/27 | |
| 2016/0278019 A1* | 9/2016 | Langer | H04W 52/04 | |
| 2016/0285505 A1* | 9/2016 | Lee | H04B 1/62 | |
| 2016/0329631 A1* | 11/2016 | Rheinfelder | H01Q 1/246 | |
| 2016/0330698 A1* | 11/2016 | Loehr | H04W 4/70 | |
| 2016/0352497 A1* | 12/2016 | Daniel | H04L 5/16 | |
| 2017/0135058 A1* | 5/2017 | Ghannouchi | H04B 1/04 | |
| 2017/0163399 A1* | 6/2017 | Lim | H04L 5/001 | |
| 2017/0180053 A1* | 6/2017 | Lozhkin | H04B 10/564 | |
| 2017/0208622 A1* | 7/2017 | Mizrahi | H04W 74/002 | |
| 2017/0288716 A1* | 10/2017 | Daniel | H04B 1/0475 | |
| 2017/0318561 A1* | 11/2017 | Harel | H04W 72/0493 | |
| 2017/0331599 A1* | 11/2017 | Tang | H04L 25/03834 | |
| 2018/0049139 A1* | 2/2018 | Lim | H04L 27/26 | |
| 2018/0103441 A1* | 4/2018 | Lim | H04W 52/383 | |
| 2018/0109367 A1* | 4/2018 | Lim | H04L 5/001 | |
| 2018/0220378 A1* | 8/2018 | Lim | H04W 72/08 | |
| 2019/0028219 A1* | 1/2019 | Lim | H04J 11/00 | |
| 2019/0052235 A1* | 2/2019 | Seo | H03F 3/245 | |

FOREIGN PATENT DOCUMENTS

| | | | | |
|---|---|---|---|---|
| JP | 2013062558 A | * | 4/2013 | H04B 1/1036 |
| JP | 2013062558 A | | 4/2013 | |
| WO | 2013184801 A2 | | 12/2013 | |
| WO | WO-2013184801 A3 | * | 1/2014 | H04B 1/1036 |

(56) References Cited

FOREIGN PATENT DOCUMENTS

| WO | 2015183791 A1 | 12/2015 | | |
| WO | WO-2015183791 A1 | * | 12/2015 | ........... H04B 1/1036 |

* cited by examiner

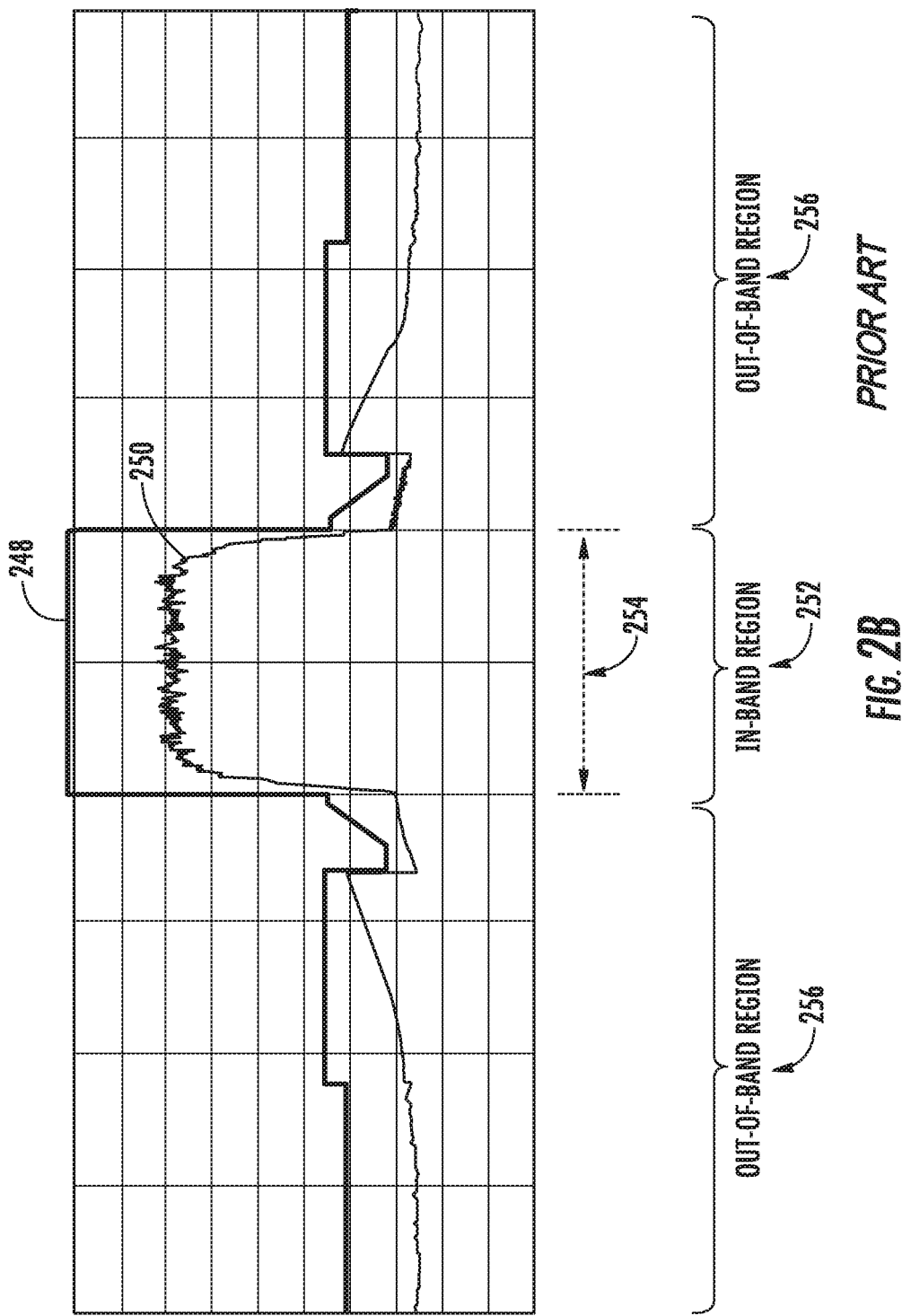

REDUCING OUT-OF-CHANNEL NOISE IN A WIRELESS DISTRIBUTION SYSTEM (WDS)

PRIORITY APPLICATIONS

This application is a continuation of U.S. application Ser. No. 15/086,861, filed Mar. 31, 2016, the content of which is relied upon and incorporated herein by reference in its entirety.

BACKGROUND

The disclosure relates generally to reducing out-of-channel noise in a wireless distribution system (WDS), such as a distributed antenna system (DAS) and, more particularly, to reducing out-of-channel noise using digital filtering in remote units in the WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of distributed antenna systems (DASs). DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the downlink communications signals 110D transmitted to the client devices 116 from the remote units 104(1)-104(N) may be required to comply with a spectrum emission mask (SEM), which is conventionally mandated by regulatory authorities such as the Federal Communications Commission (FCC) of the United States. The SEM is a mathematically defined emission ceiling applied to transmissions of the downlink communications signals 110D. The SEM is intended to reduce adjacent channel interference by limiting excessive emission beyond the intended bandwidth of the downlink communications signals 110D (also referred to as "out-of-channel" emission). In this regard, it may be desired to provide the downlink communications signals 110D in the DAS 102 to be transmitted in compliance with the SEM corresponding to the communications services.

No admission is made that any reference cited herein constitutes prior art. Applicant expressly reserves the right to challenge the accuracy and pertinency of any cited documents.

SUMMARY

Embodiments of the disclosure relate to reducing out-of-channel noise in a wireless distribution system (WDS), such as a distributed antenna system (DAS), for example. In a WDS, a plurality of remote units communicatively coupled to a head unit are each configured to receive a downlink digital communications signal in a predefined frequency channel(s) having a predefined bandwidth from a central unit. The remote units are configured to convert the downlink digital communications signal into a downlink radio frequency (RF) communications signal and amplify the downlink RF communications signal before distributing the downlink RF communications signal to respective client devices in the WDS. The downlink digital communications signal may contain analog components that introduce out-of-channel noise, such as energy leaking beyond the predefined bandwidth of the predefined frequency channel(s), third order intermodulation products, spectral regrowth, and/or spectral spurs, into the downlink RF communications signal. Thus, this out-of-channel noise is amplified along with amplification of the downlink RF communications signal, which may lead to the amplified downlink RF communications signal being non-compliant with a spectrum emission mask (SEM).

In this regard, in one aspect, digital filtering is provided by the remote units in the WDS to suppress out-of-channel noise in received downlink digital communications signal based on at least one filter configuration parameter received from one or more control circuits. The control circuit(s) is configured to determine the at least one filter configuration parameter based on physical characteristics (e.g., center frequency, bandwidth, power level, communication standard, etc.) of the downlink digital communications signal.

By suppressing the out-of-channel noise associated with the downlink digital communications signal in the remote units, the downlink RF communications signal may more easily comply with a SEM when the downlink RF communications signal is amplified in the remote units for distribution to respective client devices. Further, as an example, by suppressing out-of-channel noise at the remote units in the WDS, it may not be necessary for the central unit to perform digital filtering before distributing the downlink digital communications signal to the remote units, thus helping to reduce complexity, cost, physical size, and/or power consumption of the central unit.

One embodiment of the disclosure relates to a remote unit in a WDS configured to exchange communications signals with a plurality of remote units. The remote unit comprises a digital filter. The digital filter is configured to receive a downlink digital communications signal in a predefined frequency channel having a predefined bandwidth for at least one communications service from a central unit in the WDS. The digital filter is also configured to output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal. The remote unit also comprises a digital-to-analog converter (DAC) configured to convert the modified downlink digital communications signal into a downlink RF communications signal. The remote unit also comprises a power amplifier configured to generate an amplified downlink RF communications signal based on the downlink RF communications signal for communication to one or more client devices in the WDS. The digital filter is also configured to suppress the out-of-channel noise in the downlink digital communications signal to provide for the amplified downlink RF communications signal to comply with a SEM for the at least one communications service.

Another embodiment of the disclosure relates to a method for reducing out-of-channel noise in a remote unit in a WDS comprising a plurality of remote units. The method comprises receiving a downlink digital communications signal in a predefined frequency channel having a predefined bandwidth for at least one communications service. The method also comprises outputting a modified downlink digital communications signal based on the downlink digital communications signal and at least one filter configuration parameter determined based on one or more physical characteristics of the downlink digital communications signal to suppress out-of-channel noise in the downlink digital communications signal. The method also comprises converting the modified downlink digital communications signal into a downlink RF communications signal. The method also comprises generating an amplified downlink RF communications signal based on the downlink RF communications signal for communication to one or more client devices in the WDS. The method also comprises suppressing the out-of-channel noise in the downlink digital communications signal to provide for the amplified downlink RF communications signal to comply with a SEM for the at least one communications service.

Another embodiment of the disclosure relates to a WDS. The WDS comprises a central unit configured to communicate one or more downlink digital communications signals to a central unit communications interface communicatively coupled to at least one downlink communications medium.

The WDS also comprises a plurality of remote units. Each of the plurality of remote units comprises a remote unit communications interface communicatively coupled to the at least one downlink communications medium to receive a downlink digital communications signal among the one or more downlink digital communications signals communicated by the central unit. Each of the plurality of remote units also comprises a digital filter. The digital filter is configured to receive the downlink digital communications signal in a predefined frequency channel having a predefined bandwidth for at least one communications service. The digital filter is also configured to output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal. Each of the plurality of remote units also comprises a DAC configured to convert the modified downlink digital communications signal into a downlink RF communications signal. Each of the plurality of remote units also comprises a power amplifier configured to generate an amplified downlink RF communications signal based on the downlink RF communications signal for communication to one or more client devices in the WDS. The digital filter is further configured to suppress the out-of-channel noise in the downlink digital communications signal to provide for the amplified downlink RF communications signal to comply with a SEM for at least one communications service.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2B is an exemplary plot illustrating an exemplary spectrum emission mask (SEM) for a single-channel RF communications signal;

DETAILED DESCRIPTION

Embodiments of the disclosure relate to reducing out-of-channel noise in a wireless distribution system (WDS), such as a distributed antenna system (DAS), for example. In a WDS, a plurality of remote units communicatively coupled to a head end unit are each configured to receive a downlink digital communications signal in a predefined frequency channel(s) having a predefined bandwidth from a central unit. The remote units are configured to convert the downlink digital communications signal into a downlink radio frequency (RF) communications signal and amplify the downlink RF communications signal before distributing the downlink RF communications signal to respective client devices in the WDS. The downlink digital communications signals may contain analog components that introduce out-of-channel noise, such as energy leaking beyond the predefined bandwidth of the predefined frequency channel(s), third order intermodulation products, spectral regrowth, and/or spectral spurs, into the downlink RF communications signal. Thus, this out-of-channel noise is amplified along with amplification of the downlink RF communications signal, which may lead to the amplified downlink RF communications signal being non-compliant with a spectrum emission mask (SEM).

In this regard, in one aspect, digital filtering is provided by the remote units in the WDS to suppress out-of-channel noise in received downlink digital communications signal based on at least one filter configuration parameter received from one or more control circuits. The control circuit(s) is configured to determine the at least one filter configuration parameter based on physical characteristics (e.g., center frequency, bandwidth, power level, communication standard, etc.) of the downlink digital communications signal. By suppressing the out-of-channel noise associated with the downlink digital communications signal in the remote units, the downlink RF communications signal may more easily comply with a SEM when the downlink RF communications signal is amplified in the remote units for distribution to respective client devices. Further, as an example, by suppressing out-of-channel noise at the remote units in the WDS, it may not be necessary for the central unit to perform digital filtering before distributing the downlink digital communications signal to the remote units, thus helping to reduce complexity, cost, physical size, and/or power consumption of the central unit.

Before discussing examples of reducing out-of-channel noise in a WDS (e.g., a DAS) employing digital filtering in one or more remote units to reduce out-of-channel noise of a downlink digital communications signal starting at FIG. 3, an overview of an exemplary WDS for distributing one or more downlink digital communications signals without suppressing out-of-channel noise in the downlink digital communications signals is first discussed with reference to FIGS. 2A-2C.

Figure 1:
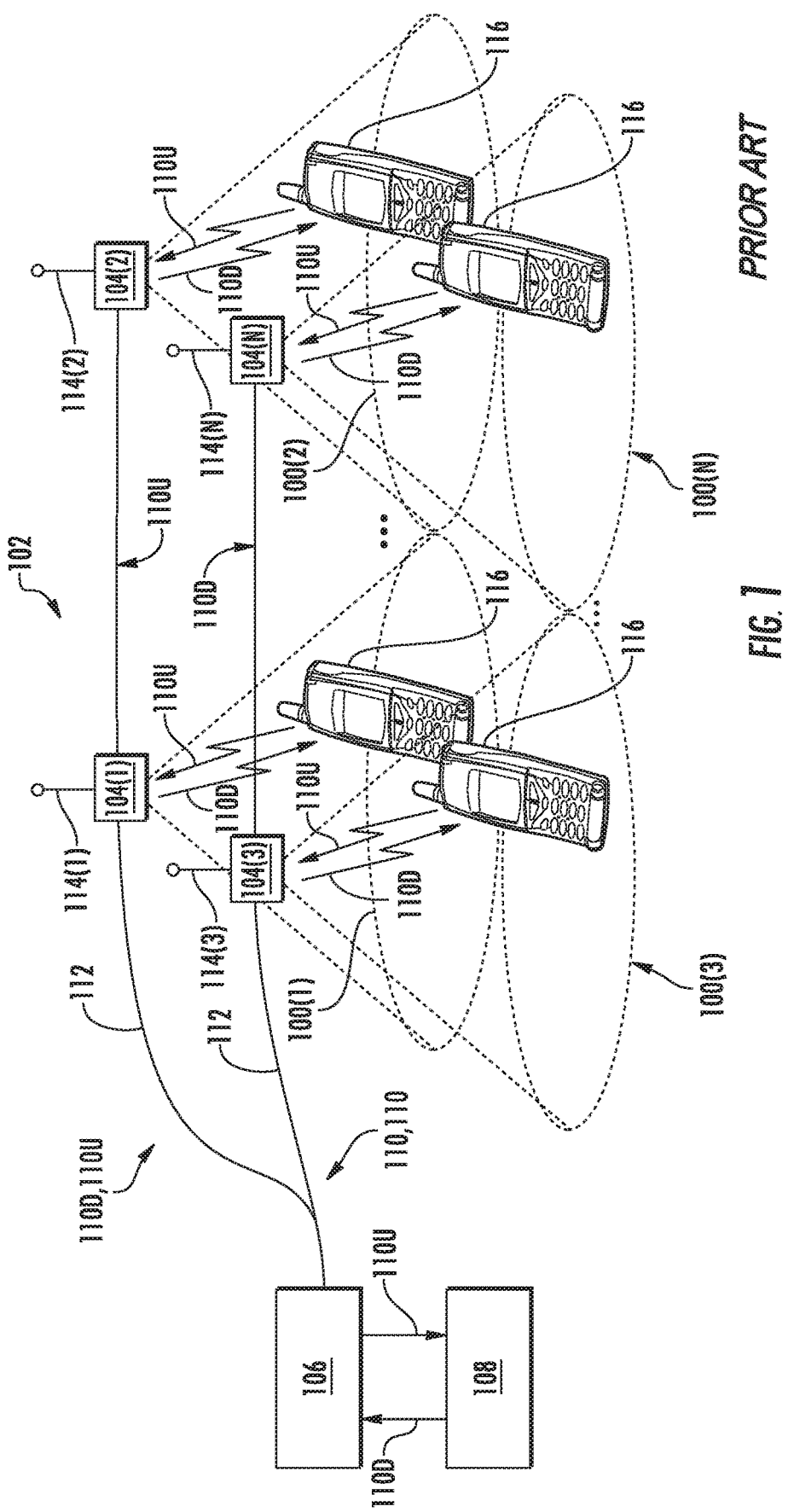
FIG. 1 is a schematic diagram of an exemplary wireless distribution system (WDS)
Figure 2A:
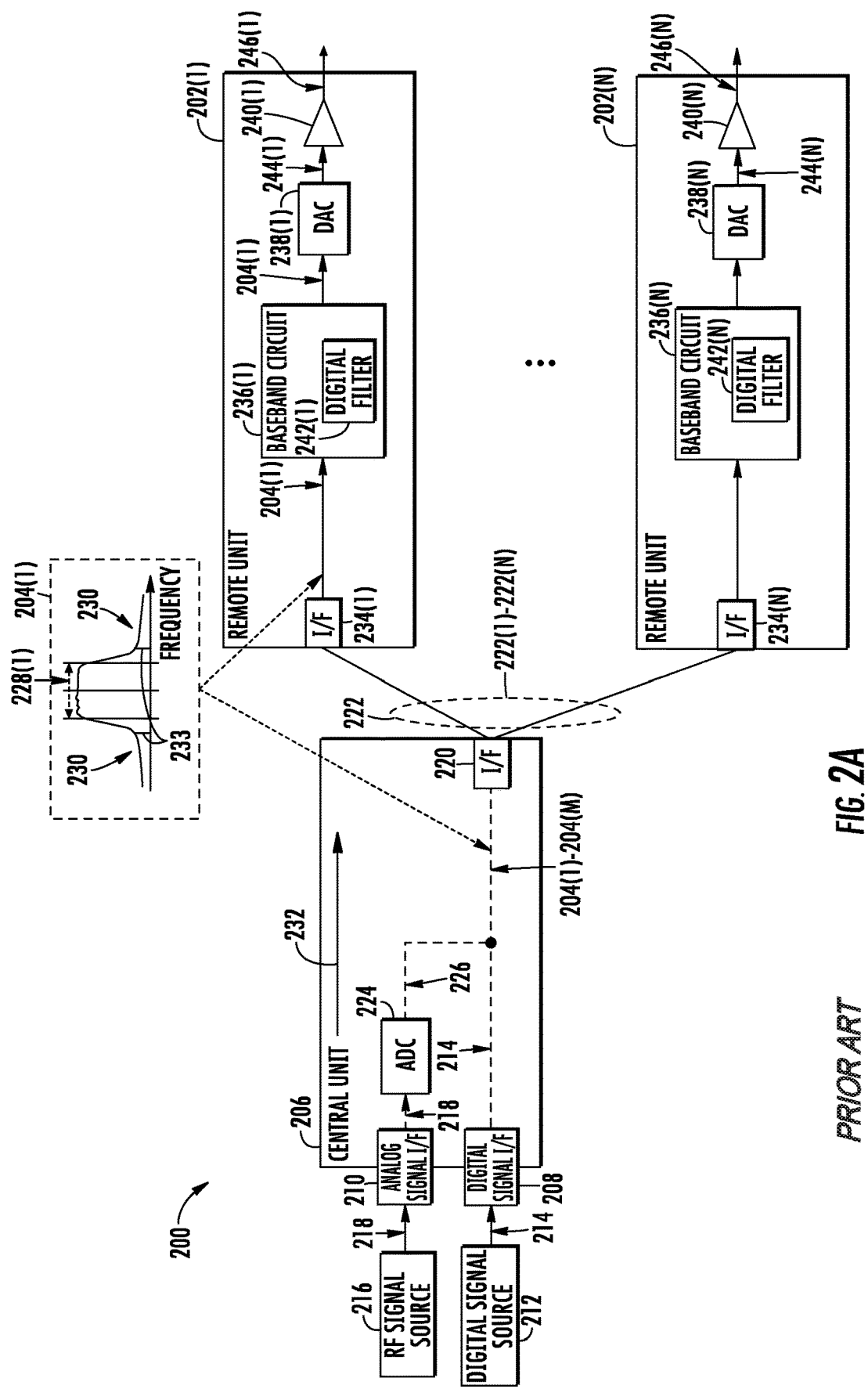
FIG. 2A is a schematic diagram of an exemplary WDS that includes a plurality of remote units configured to receive and distribute one or more downlink digital communications signals without suppressing out-of-channel noise associated with the one or more downlink digital communications signals.

In this regard, FIG. 2A is a schematic diagram of an exemplary WDS 200. The WDS 200 includes a plurality of remote units 202(1)-202(N) configured to receive and distribute one or more downlink digital communications signals 204(1)-204(M) without suppressing out-of-channel noise associated with the downlink digital communications signals 204(1)-204(M). The WDS 200 includes a central unit 206. The central unit 206 includes a digital signal interface 208 and an analog signal interface 210. The digital signal interface 208 may be communicatively coupled to a digital signal source 212 to receive a digital downlink communications signal 214. In a non-limiting example, the digital signal source 212 may be a baseband unit (BBU), and the digital downlink communications signal 214 may be provided according to a common public radio interface (CPRI) protocol. The analog signal interface 210 may be communicatively coupled to an RF signal source 216 to receive an analog downlink communications signal 218. In a non-limiting example, the RF signal source 216 may be a base transceiver station (BTS). In this regard, the central unit 206 may receive the digital downlink communications signal 214 and the analog downlink communications signal 218 concurrently for distribution in the WDS 200.

The central unit 206 also includes a central unit communications interface 220. The central unit communications interface 220 is coupled to at least one downlink communications medium 222. In this example, the downlink communications medium 222 is comprised of a plurality of downlink communications media 222(1)-222(N) each dedicated to a link to a remote unit 202 among the remote units 202(1)-202(N). In a non-limiting example, the central unit communications interface 220 is a digital communications interface for distributing the downlink digital communications signals 204(1)-204(M) to the remote units 202(1)-202(N). Since the central unit 206 may concurrently receive the digital downlink communications signal 214 and the analog downlink communications signal 218, the downlink digital communications signals 204(1)-204(M) may include both the digital downlink communications signal 214 and the analog downlink communications signal 218. As such, an analog-to-digital converter (ADC) 224 is provided in the central unit 206 to convert the analog downlink communications signal 218 into a second digital downlink communications signal 226. In this regard, the downlink digital communications signals 204(1)-204(M) may include the digital downlink communications signal 214 and/or the second digital downlink communications signal 226.

The downlink digital communications signals 204(1)-204(M) occupy one or more frequency channels (not shown) each having a predefined bandwidth 228(1)-228(M) (228(2)-228(M) not shown). For example, the downlink digital communications signal 204(1) may occupy a seven hundred forty-eight megahertz (748 MHz) channel with a predefined bandwidth 228(1) of five MHz (5 MHz). The downlink digital communications signal 204(2) may occupy a seven hundred sixty-two MHz (762 MHz) channel with a predefined bandwidth 228(2) of ten MHz (10 MHz). For the convenience of discussion and illustration, the downlink digital communications signal 204(1) and the remote unit 202(1) are discussed hereinafter as non-limiting examples.

With continuing reference to FIG. 2A, the downlink digital communications signal 204(1) is received by the central unit 206 via the analog signal interface 210. As such, the downlink digital communications signal 204(1) may contain analog components (not shown) that may be distorted due to imperfections of analog processing elements, thus creating out-of-channel noise 230 outside the predefined bandwidth 228(1) of the downlink digital communications signal 204(1). In a non-limiting example, non-linearity in a power amplifier (not shown) in a downlink signal path 232, may distort the downlink digital communications signal 204(1). In this regard, the out-of-channel noise 230 includes energy leaking beyond the predefined bandwidth 228(1) of a predefined frequency channel (e.g., 748 MHz channel). In one example, the out-of-channel noise 230 includes third order intermodulation products 233 that may be created above and below the predefined bandwidth 228(1) when the downlink digital communications signal 204(1) and the downlink digital communications signal 204(2) are fed through the non-linear power amplifier. For example, the downlink digital communications signal 204(1) and the downlink digital communications signal 204(2) correspond to center frequencies $f_1$ and $f_2$, respectively. The third order intermodulation products 233 will occur at frequencies $(2f_1-f_2)$ and $(2f_2-f_1)$. In another example, the out-of-channel noise 230 may include inherent noise associated with the analog processing elements (e.g., the power amplifier and the ADC 224) and the downlink signal path 232. In another example, the out-of-channel noise 230 may include spectral regrowth and/or spectral spur (not shown), which is created by the non-linear power amplifier when the downlink digital communications signal 204(1) and the downlink digital communications signal 204(2) are varying envelope signals. In this regard, the out-of-channel noise 230 includes the energy leaking beyond the predefined bandwidth 228(1) of a predefined frequency channel, the third order intermodulation products 233, and the spectral regrowth and/or spectral spur.

With continuing reference to FIG. 2A, the remote units 202(1)-202(N) include a plurality of remote unit communications interfaces 234(1)-234(N), respectively. The remote unit communications interfaces 234(1)-234(N) are each communicatively coupled to the downlink communications medium 222 to receive the downlink digital communications signals 204(1)-204(M). The remote units 202(1)-202(N) include a plurality of baseband circuits 236(1)-236(N), a plurality of digital-to-analog converters (DACs) 238(1)-238(N), and a plurality of power amplifiers 240(1)-240(N), respectively. The baseband circuits 236(1)-236(N) further include a plurality of digital filters 242(1)-242(N), respectively. The DACs 238(1)-238(N) generate a plurality of downlink RF communications signals 244(1)-244(N), respectively. The power amplifiers 240(1)-240(N) amplify the downlink RF communications signals 244(1)-244(N) to generate a plurality of amplified downlink RF communications signals 246(1)-246(N), respectively. The remote unit 202(1) receives the downlink digital communications signal 204(1) via the remote unit communications interface 234(1). The out-of-channel noise 230 in the received downlink digital communications signal 204(1) may have increased further due to inherent noise associated with the downlink communications medium 222. The downlink digital communications signal 204(1) may pass through the digital filter 242(1) in the baseband circuit 236(1) without adequate suppression of the out-of-channel noise 230. The DAC 238(1) converts the downlink digital communications signal 204(1) into the downlink RF communications signal 244(1). The downlink RF communications signal 244(1) is amplified by the power amplifier 240(1) to generate the amplified downlink RF communications signal 246(1) for distribution to one or more client devices (not shown) in the WDS 200.

Some regulatory authorities, such as the Federal Communications Commission (FCC) of the United States, mandate that the amplified downlink RF communications signals 246(1)-246(N) be transmitted in compliance with a spectrum emission mask (SEM). As such, the amplified downlink RF communications signal 246(1) must comply with the SEM determined by the regulatory authorities. However, the out-of-channel noise 230 present in the amplified downlink RF communications signal 246(1) may cause the amplified downlink RF communications signal 246(1) not be in compliance with the SEM for the communications service provided by the amplified downlink RF communications signal 246(1).

In this regard, FIG. 2B is an exemplary plot illustrating a SEM 248 for a single-channel RF communications signal 250. The SEM 248 is a mathematically defined emission ceiling applied to transmissions of the single-channel RF communications signal 250. To comply with the SEM 248, energy emissions from the single-channel RF communications signal 250 must stay below the SEM 248 in an in-channel region 252, which is within a predefined bandwidth 254. The energy emissions from the single-channel RF communications signal 250 must also stay below the SEM 248 in out-of-channel regions 256 that fall outside the predefined bandwidth 254. The SEM 248 may be associated with a specific communications technology, such as long-term evolution (LTE), and/or a specific RF spectrum (e.g., 748 MHz channel or 762 MHz channel). In a non-limiting example, the single-channel RF communications signal 250 may be the same as the amplified downlink RF communications signal 246(1) of FIG. 2A. In this regard, energy emissions of the amplified downlink RF communications signal 246(1) must stay below the SEM 248 in both the in-channel region 252 and the out-of-channel regions 256 to satisfy the mandatory regulatory requirements.

In a non-limiting example, the amplified downlink RF communications signal 246(1) may be transmitted over multiple frequency channels (not shown). In this regard, FIG. 2C is an exemplary plot illustrating a SEM 258 for a multi-channel RF communications signal 260. With reference to FIG. 2C, the multi-channel RF communications signal 260 occupies a plurality of frequency channels 262(1)-262(O). To comply with the SEM 258, energy emissions from the multi-channel RF communications signal 260 must stay below the SEM 258 in an in-channel region 264, which is within a predefined bandwidth 266 corresponding to the frequency channels 262(1)-262(O), and in out-of-channel regions 268 that fall outside the predefined bandwidth 266. In a non-limiting example, the multi-channel RF communications signal 260 may be the same as the amplified downlink RF communications signal 246(1) of FIG. 2A. In this regard, energy emissions of the amplified downlink RF communications signal 246(1) must stay below the SEM 258 in both the in-channel region 264 and the out-of-channel regions 268 to satisfy the mandatory regulatory requirements.

Figure 2C:
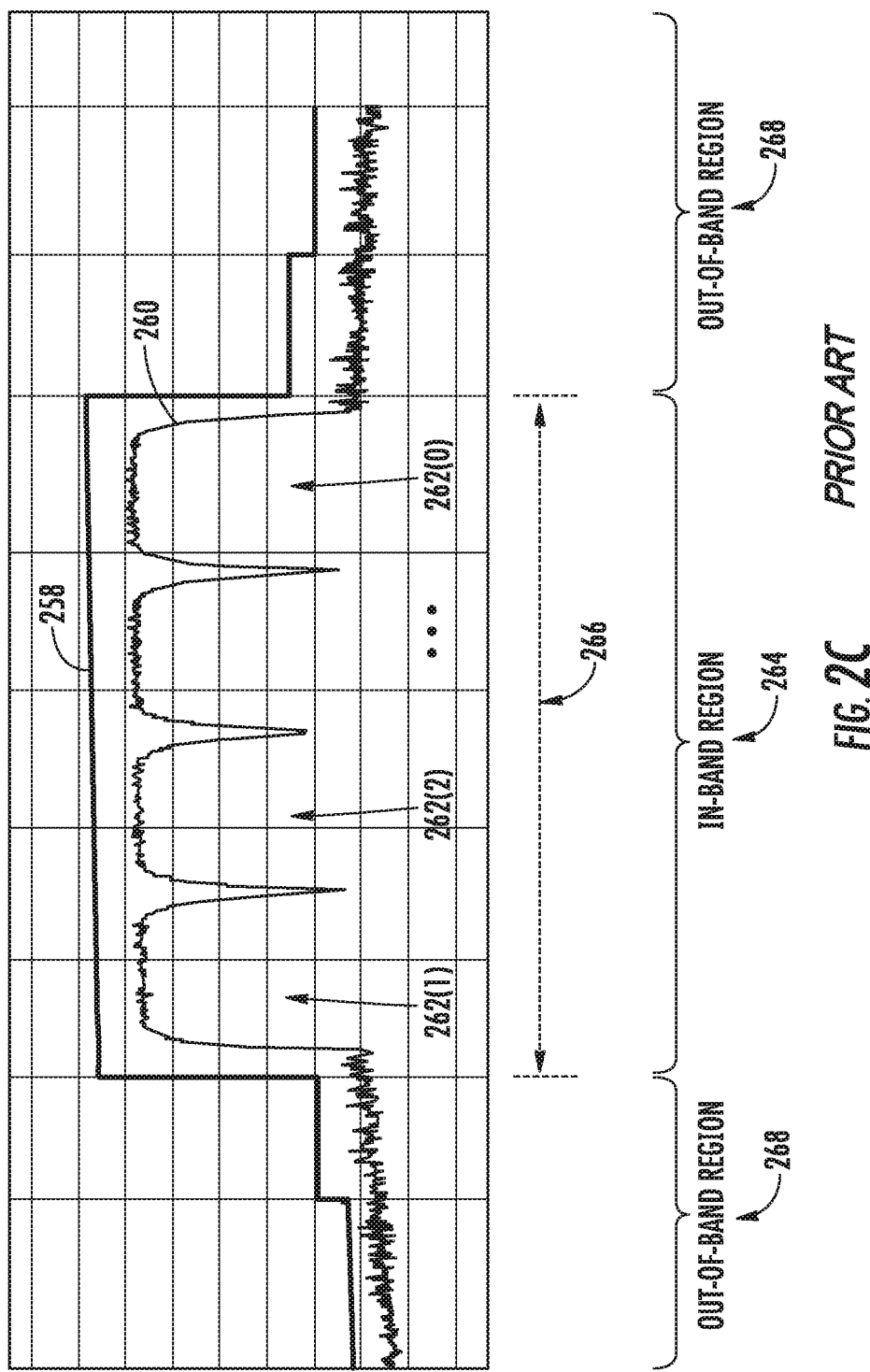
FIG. 2C is an exemplary plot illustrating an exemplary SEM for a multi-channel RF communications signal.

With reference back to FIG. 2A, to provide for compliance of the amplified downlink RF communications signal 246(1) with the SEM 248 of FIG. 2B or the SEM 258 of FIG. 2C, it may be necessary to adequately suppress the out-of-channel noise 230 associated with the downlink digital communications signal 204(1). Specifically, it may be desired to adequately suppress the out-of-channel noise 230 before converting the downlink digital communications signal 204(1) into the downlink RF communications signal 244(1) and amplifying the downlink RF communications signal 244(1) to generate the amplified downlink RF communications signal 246(1). In a conventional WDS like the WDS 200, it may be possible to adequately suppress the out-of-channel noise 230 using one of (or a combination of) the methods described below.

In one aspect, the digital filter 242(1) in the remote unit 202(1) could be enhanced to provide a sharper cut-off of the out-of-channel noise 230. However, upgrading the digital filter 242(1) to a sharp filter may lead to increased processing delay and higher component costs of the remote unit 202(1). According to another aspect, it may be possible to adequately suppress the out-of-channel noise 230 in the central unit 206 before providing the downlink digital communications signals 204(1)-204(M) to the central unit communications interface 220. However, since the downlink digital communications signals 204(1)-204(M) may occupy a much wider spectrum, a broadband digital filter or multiple narrowband digital filters may be required. In this regard, the central unit 206 would require higher performance circuits to support the broadband digital filter or the multiple narrowband digital filters. As a result, it may be necessary to upgrade the central unit 206, thus leading to increased complexity, cost, physical size, and power consumption of the central unit 206. Furthermore, digital filtering performed at the central unit 206 will not prevent inherent noise associated with the downlink communications medium 222 from being added to the downlink digital communications signals 204(1)-204(M).

Hence, it may be desired to provide an alternative solution to adequately suppress the out-of-channel noise 230 in the downlink digital communications signals 204(1)-204(M) while overcoming the shortcomings associated with the above two conventional methods. In this regard, FIG. 3 is a schematic diagram of an exemplary WDS 300 including a plurality of remote units 302(1)-302(N) configured to suppress out-of-channel noise 304 that may be associated with one or more downlink digital communications signals 306(1)-306(M) to provide a communications service(s) via a plurality of amplified downlink RF communications signals 308(1)-308(N) that complies with the SEM 248 of FIG. 2B and the SEM 258 of FIG. 2C. By suppressing the out-of-channel noise 304 associated with the downlink digital communications signals 306(1)-306(M) in the remote units 302(1)-302(N), the amplified downlink RF communications signals 308(1)-308(N) may more easily comply with the SEM 248 and the SEM 258 when the amplified downlink RF communications signals 308(1)-308(N) are distributed from the remote units 302(1)-302(N) to respective client devices. Further, as an example, by suppressing out-of-channel noise 304 at the remote units 302(1)-302(N), it is not necessary for a central unit 310 in the WDS 300 to perform digital filtering before distributing the downlink digital communications signals 306(1)-306(M) to the remote units 302(1)-302(N), thus helping to reduce complexity, cost, physical size, and/or power consumption of the central unit 310.

Figure 3:
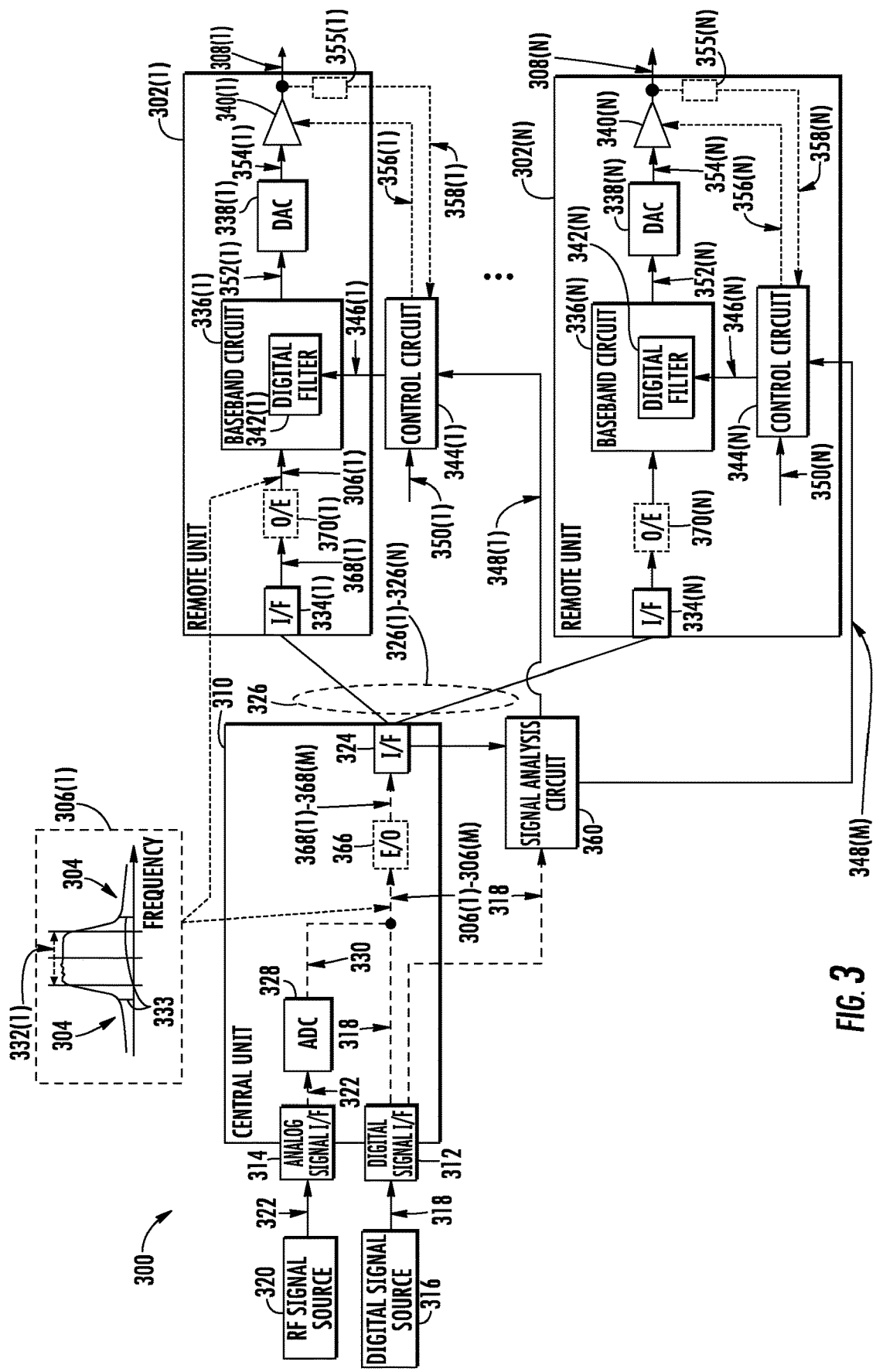
FIG. 3 is a schematic diagram of an exemplary WDS including a plurality of remote units employing a plurality of digital filters to suppress out-of-channel noise that may be associated with one or more downlink digital communications signals to provide a communications service(s) via a plurality of amplified downlink RF communications signals that complies with the SEMs of FIGS. 2B and 2C.

With continuing reference to FIG. 3, the central unit 310 includes a digital signal interface 312 and an analog signal interface 314. The digital signal interface 312 is communicatively coupled to a digital signal source 316 to receive a digital downlink communications signal 318. In a non-limiting example, the digital signal source 316 may be a BBU, and the digital downlink communications signal 318 may be provided according to the CPRI protocol, an open base station architecture initiative (OBSAI) protocol, an open radio equipment interface (ORI) protocol, or a proprietary protocol. The analog signal interface 314 is communicatively coupled to an RF signal source 320 to receive an analog downlink communications signal 322. In a non-limiting example, the RF signal source 320 may be a BTS. In this regard, the central unit 310 may receive the digital downlink communications signal 318 and the analog downlink communications signal 322 concurrently for distribution in the WDS 300.

The central unit 310 also includes a central unit communications interface 324. The central unit communications interface 324 is coupled to at least one downlink communications medium 326. In this example, the downlink communications medium 326 is comprised of a plurality of downlink communications media 326(1)-326(N) each dedicated to communicatively couple to a remote unit 302 among the remote units 302(1)-302(N). In a non-limiting example, the central unit communications interface 324 is a digital communications interface for distributing the downlink digital communications signals 306(1)-306(M) to the remote units 302(1)-302(N). Since the central unit 310 may concurrently receive the digital downlink communications signal 318 and the analog downlink communications signal 322, the downlink digital communications signals 306(1)-306(M) may include both the digital downlink communications signal 318 and the analog downlink communications signal 322. As such, an analog-to-digital converter (ADC) 328 is provided in the central unit 310 to convert the analog downlink communications signal 322 into a second digital downlink communications signal 330, which may be a digital replica of the analog downlink communications signal 322. In this regard, the downlink digital communications signals 306(1)-306(M) may include the digital downlink communications signal 318 and/or the second digital downlink communications signal 330.

The downlink digital communications signals 306(1)-306(M) occupy one or more frequency channels each having a predefined bandwidth 332(1)-332(M) (332(2)-332(M) not shown). For example, the downlink digital communications signal 306(1) may have a predefined bandwidth 332(1). The downlink digital communications signal 306(1) is received by the central unit 310 via the analog signal interface 314. As such, the downlink digital communications signal 306(1) may contain analog components that are distorted due to imperfections of analog processing elements, thus creating the out-of-channel noise 304 outside the predefined bandwidth 332(1) of the downlink digital communications signal 306(1). In this regard, the out-of-channel noise 304 includes energy leaking beyond the predefined bandwidth 332(1). In one example, the out-of-channel noise 304 may include third order intermodulation products 333 that may be created above and below the predefined bandwidth 332(1). In another example, the out-of-channel noise 304 may include spectral regrowth and/or spectral spur (not shown) resulting from all other intermodulation products. In this regard, the out-of-channel noise 304 includes the energy leaking beyond the predefined bandwidth 332(1), the third order intermodulation products 333, and the spectral regrowth and/or spectral spur.

With continuing reference to FIG. 3, the remote units 302(1)-302(N) include a plurality of remote unit communications interfaces 334(1)-334(N), respectively. The remote unit communications interfaces 334(1)-334(N) are each communicatively coupled to the downlink communications media 326(1)-326(N) to receive the downlink digital communications signals 306(1)-306(M), respectively. The remote units 302(1)-302(N) include a plurality of baseband circuits 336(1)-336(N), a plurality of digital-to-analog converters (DACs) 338(1)-338(N), and a plurality of power amplifiers 340(1)-340(N), respectively. The baseband circuits 336(1)-336(N) are configured to provide digital processing to the downlink digital communications signals 306(1)-306(M) (e.g., frequency downshifting, demodulation, error correction, etc.). The baseband circuits 336(1)-336(N) include a plurality of digital filters 342(1)-342(N), respectively. In a non-limiting example, the digital filters 342(1)-342(N) are Butterworth filters and/or Chebyshev filters. The digital filters 342(1)-342(N) are coupled to a plurality of control circuits 344(1)-344(N), respectively. In one example, the control circuits 344(1)-344(N) may be located outside remote unit among the remote units 302(1)-302(N), such as the control circuit 344(1) in the remote unit 302(1). In another example, the control circuits 344(1)-344(N) may be located inside a remote unit among the remote units 302(1)-302(N), such as the control circuit 344(N) illustrated in the remote unit 302(N). The remote units 302(1)-302(N) include a plurality of analog-to-digital converters (ADCs) 355(1)-355(N). The ADCs 355(1)-355(N) enables feedback from the power amplifiers 340(1)-340(N) to the control circuits 344(1)-344(N), respectively.

For the convenience of discussion and illustration, the downlink digital communications signal 306(1) and the remote unit 302(1) are discussed hereinafter as a non-limiting example. It shall be appreciated that aspects discussed with references to the downlink digital communications signal 306(1) and the remote unit 302(1) are applicable to any of the other downlink digital communications signals 306(2)-306(M) and remote units 302(2)-302(N). It shall also be appreciated multiple downlink communications signals among the downlink digital communications signals 306(1)-306(M) may be distributed to the remote unit 302(1).

With continuing reference to FIG. 3, the remote unit 302(1) receives the downlink digital communications signal 306(1), which may be associated with the out-of-channel noise 304. The digital filter 342(1) in the remote unit 302(1) is configured to receive the downlink digital communications signal 306(1) via the remote unit communications interface 334(1). The digital filter 342(1) includes a set of filter configuration parameters that can be dynamically configured by the control circuit 344(1). The control circuit 344(1) is configured to dynamically determine at least one filter configuration parameter 346(1) based on one or more physical characteristics 348(1) of the downlink digital communications signal 306(1). In a non-limiting example, the physical characteristics 348(1) of the downlink digital communications signal 306(1) may include center frequency, bandwidth, power level, and/or communication technology of the downlink digital communications signal 306(1). In a non-limiting example, the control circuit 344(1) uses the center frequency and bandwidth of the downlink digital communications signal 306(1) to configure bandwidth and allowed passband ripple of the digital filter 342(1), thus suppressing the out-of-channel noise 304. For example, the downlink digital communications signal 306(1) may include a long-term evolution (LTE) communications signal or a wideband code division multiple access (WCDMA) communications signal. The LTE communications signal has a center frequency of one thousand nine hundred ninety-two point five megahertz (1992.5 MHz) and a five megahertz (5 MHz) bandwidth. The WCDMA communications signal has a center frequency of one thousand nine hundred sixty-two point five megahertz (1962.5 MHz) and a three point eight four megahertz (3.84 MHz) bandwidth. Based on the center frequency and the bandwidth of the downlink digital communications signal 306(1), the control circuit 344(1) can configure stop band attenuation and order of the digital filter 342(1) accordingly to suppress the out-of-channel noise 304. In this regard, when the physical characteristics 348(1) indicate that the downlink digital communications signal 306(1) is the LTE communications signal, the control circuit 344(1) configures the digital filter 342(1) to operate at 1992.5 MHz center frequency with 5 MHz bandwidth. As such, the digital filter 342(1) can effectively suppress out-of-channel noise 304 located below one thousand nine hundred ninety megahertz (1990 MHz) and above one thousand nine hundred ninety five megahertz (1995 MHz). Likewise, when the physical characteristics 348(1) indicate that the downlink digital communications signal 306(1) is the WCDMA communications signal, the control circuit 344(1) configures the digital filter 342(1) to operate at 1962.5 MHz center frequency with 3.84 MHz bandwidth. As a result, the digital filter 342(1) can effectively suppress out-of-channel noise 304 located below one thousand nine hundred sixty point five eight megahertz (1960.58 MHz) and above one thousand nine hundred sixty-four point four two megahertz (1964.42 MHz). In addition, the control circuit 344(1) may determine the filter configuration parameter 346(1) by further taking into consideration additional information 350(1), which may include adjacent channel power ratio (ACPR) for the downlink digital communications signal 306(1), for example.

With continuing reference to FIG. 3, the digital filter 342(1) is configured to output a modified downlink digital communications signal 352(1) based on the downlink digital communications signal 306(1) and the filter configuration parameter 346(1) received from the control circuit 344(1). In this regard, by reconfiguring the digital filter 342(1) based on the filter configuration parameter 346(1) determined according to the physical characteristics 348(1) of the downlink digital communications signal 306(1), it is possible to adequately suppress the out-of-channel noise 304 in the modified downlink digital communications signal 352(1). In this regard, the modified downlink digital communications signal 352(1) is "cleaner" than the downlink digital communications signal 306(1) as a result of adequate suppression of the out-of-channel noise 304 by the digital filter 342(1). By being "cleaner," the out-of-channel noise 304 in the modified downlink digital communications signal 352(1) is substantially lower than the out-of-channel noise 304 in the downlink digital communications signal 306(1). As such, it may not be necessary for the central unit 310 to suppress the out-of-channel noise 304 before providing the downlink digital communications signal 306(1) to the central unit communications interface 324, thus helping reduce complexity, cost, physical size, and power consumption of the central unit 310. Furthermore, it may also not be necessary to replace the digital filter 342(1) with a sharp digital filter at the remote unit 302(1). As a result, it may help relax digital signal processor (DSP) (e.g., field-programmable gate array (FPGA)) processing loads, thus avoiding unnecessary processing delays that may result from the sharp digital filter.

With continuing reference to FIG. 3, the DAC 338(1) receives and converts the modified downlink digital communications signal 352(1) into a downlink RF communications signal 354(1). The power amplifier 340(1) is configured to amplify the downlink RF communications signal 354(1) to generate the amplified downlink RF communications signal 308(1). As discussed above, the physical characteristics 348(1) of the downlink digital communications signal 306(1) may include center frequency, bandwidth, power level, and/or communication technology of the downlink digital communications signal 306(1). Based on the communication technology, the center frequency, and the bandwidth of the downlink digital communications signal 306(1), the control circuit 344(1) is able to determine the exact spectral emission requirements associated with the SEM 248 of FIG. 2B and/or the SEM 258 of FIG. 2C. Based on the power level of the downlink digital communications signal 306(1) as indicated in the physical characteristics 348(1), the control circuit 344(1) is able to control the power amplifier 340(1) to provide the amplified downlink RF communications signal 308(1) in compliance with the SEM 248 of FIG. 2B and/or the SEM 258 of FIG. 2C.

In a non-limiting example, the control circuit 344(1) is configured to control the power amplifier 340(1) based on the physical characteristics 348(1) of the downlink digital communications signal 306(1) via a control signal 356(1). Additionally, the control circuit 344(1) may receive a SEM feedback signal 358(1) indicating a power level of the amplified downlink RF communications signal 308(1). The ADC 355(1) is configured to convert the amplified downlink RF communications signal 308(1) into the SEM feedback signal 358(1) indicating the power level of the amplified downlink RF communications signal 308(1). Based on the SEM feedback signal 358(1) and the power level of the downlink digital communications signal 306(1), the control circuit 344(1) can adjust the digital filter 342(1) via the filter configuration parameter 346(1) and/or adjust the power amplifier 340(1) via the control signal 356(1) when the control circuit 344(1) determines that the amplified downlink RF communications signal 308(1) exceeds the SEM 248 of FIG. 2B and/or the SEM 258 of FIG. 2C.

With continuing reference to FIG. 3, the control circuits 344(1)-344(N) are communicatively coupled to at least one signal analysis circuit 360. In a non-limiting example, the signal analysis circuit 360 may be provided in the central unit 310 or be collocated with the central unit 310. The signal analysis circuit 360 is configured to determine the physical characteristics 348(1)-340(N) for the downlink digital communications signals 306(1)-306(M). In a non-limiting example, the signal analysis circuit 360 is configured to determine each of the physical characteristics 348(1)-348(M) for each of the downlink digital communications signals 306(1)-306(M) using techniques such as Fast Fourier Transform (FFT). In this regard, the control circuit 344(1) in the remote unit 302(1) receives the physical characteristics 348(1) of the downlink digital communications signal 306(1) from the signal analysis circuit 360. In a non-limiting example, the remote unit 302(1) receives the physical characteristics 348(1) from the signal analysis circuit 360 via the downlink communications medium 326(1).

In one non-limiting example, the signal analysis circuit 360 is communicatively coupled to the central unit communications interface 324. In this regard, the signal analysis circuit 360 can determine the physical characteristics 348(1)-348(M) for the digital downlink communications signal 318 and the second digital downlink communications signal 330 converted from the analog downlink communications signal 322. In another non-limiting example, the signal analysis circuit 360 may be communicatively coupled to the digital signal interface 312. In this regard, the signal analysis circuit 360 can determine the physical characteristics 348(1)-348(M) for the digital downlink communications signal 318.

The remote unit 302(1) may be configured to suppress the out-of-channel noise 304 according to an out-of-channel noise reduction process. In this regard, FIG. 4 is a flowchart of an exemplary out-of-channel noise reduction process 400 that may be employed in each of the remote units 302(1)-302(N) of FIG. 3 to reduce the out-of-channel noise 304 associated with the downlink digital communications signals 306(1)-306(M).

Figure 4:
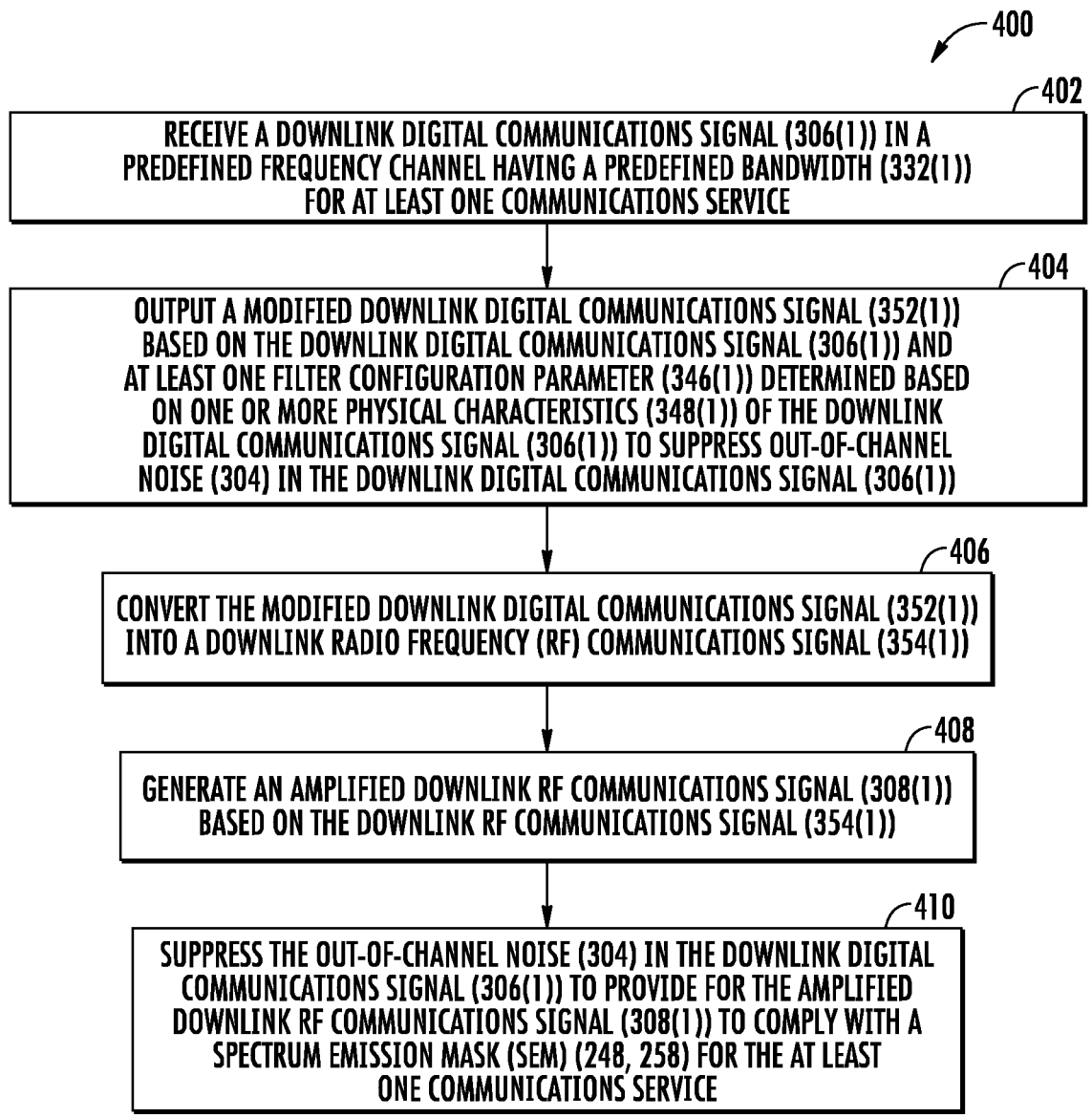
FIG. 4 is a flowchart of an exemplary out-of-channel noise reduction process that may be employed in one or more of the plurality of remote units in the WDS of FIG. 3, to reduce the out-of-channel noise associated with the one or more downlink digital communications signals.

With reference to FIG. 4, the remote unit 302(1) among the remote units 302(1)-302(N) is configured to receive the downlink digital communications signal 306(1) in the predefined frequency channel (e.g., 748 MHz channel) having the predefined bandwidth 332(1) for at least one communications service (block 402). The digital filter 342(1) is configured to output the modified downlink digital communications signal 352(1) based on the downlink digital communications signal 306(1) and the filter configuration parameter 346(1) determined based on the physical characteristics 348(1) of the downlink digital communications signal 306(1) to suppress the out-of-channel noise 304 in the downlink digital communications signal 306(1) (block 404). The DAC 338(1) is configured to convert the modified downlink digital communications signal 352(1) into the downlink RF communications signal 354(1) (block 406). The power amplifier 340(1) is configured to generate the amplified downlink RF communications signal 308(1) based on the downlink RF communications signal 354(1) (block 408). The digital filter 342(1) is further configured to suppress the out-of-channel noise 304 in the downlink digital communications signal 306(1) to provide for the amplified downlink RF communications signal 308(1) to comply with the SEM 248 of FIG. 2B or the SEM 258 of FIG. 2C for the at least one communications service (block 410).

With reference back to FIG. 3, in a non-limiting example, the WDS 300 is provided as an optical fiber-based WDS. In this regard, the downlink communications medium 326(1) may be an optical fiber-based downlink communications medium. Accordingly, the central unit 310 may include an electrical-to-optical (E/O) converter 366 configured to convert the downlink digital communications signals 306(1)-306(M) into one or more optical downlink digital communications signals 368(1)-368(M). The E/O converter 366 then provides the optical downlink digital communications signals 368(1)-368(M) to the central unit communications interface 324. The remote unit 302(1) includes an optical-to-electrical (O/E) converter 370(1) configured to receive the optical downlink digital communications signal 368(1) among the optical downlink digital communications signals 368(1)-368(M) from the remote unit communications interface 334(1). The O/E converter 370(1) is then configured to convert the optical downlink digital communications signal 368(1) into the downlink digital communications signal 306(1).

Figure 5:
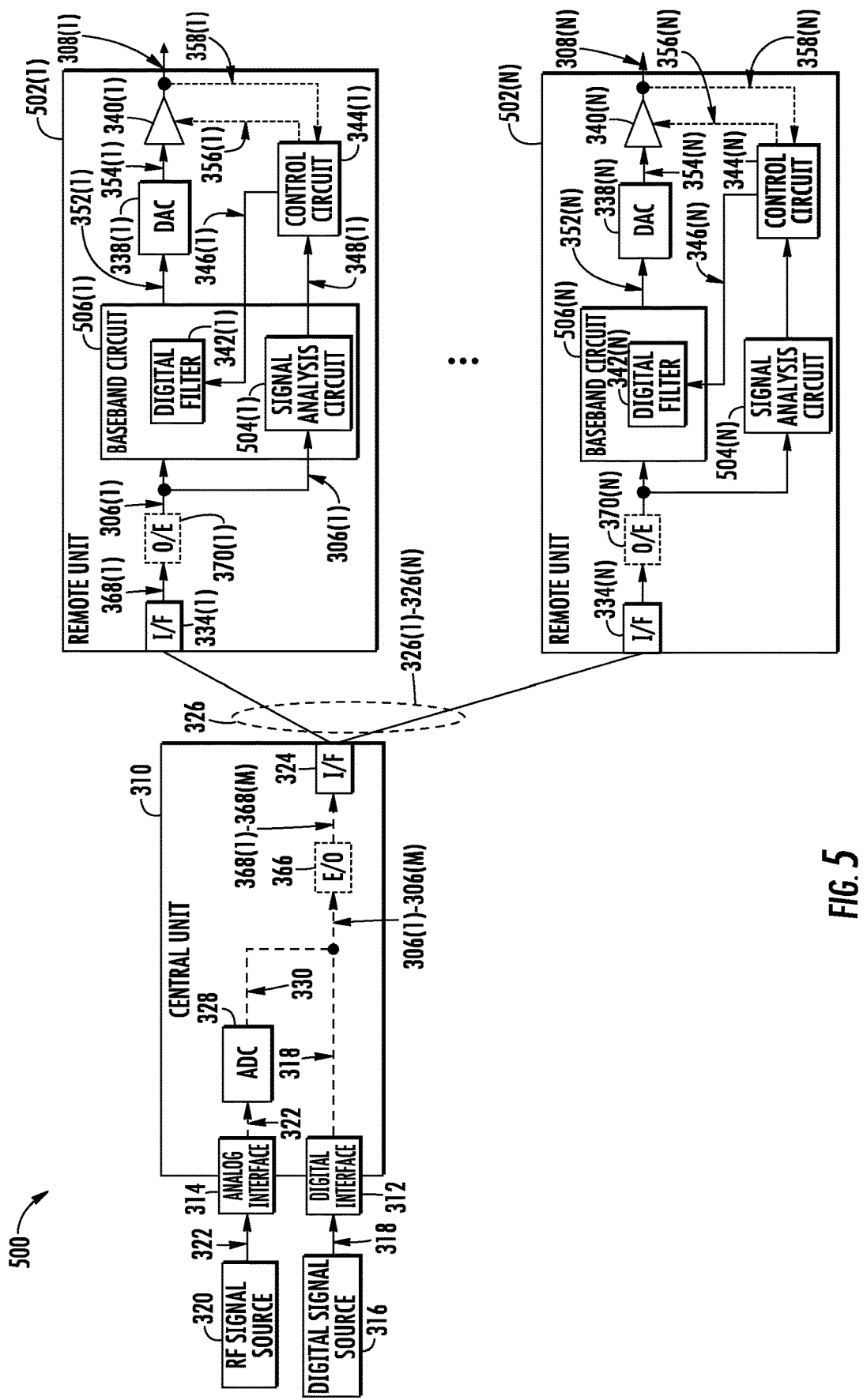
FIG. 5 is a schematic diagram of an exemplary WDS in which a plurality of remote units includes a plurality of signal analysis circuits, respectively, for determining one or more physical characteristics of each of the one or more downlink digital communications signals.

Alternative to providing the signal analysis circuit 360 of FIG. 3 in the central unit 310, or co-locating the signal analysis circuit 360 with the central unit 310, it is also possible to deploy the signal analysis circuit 360 in one or more of the remote units 302(1)-302(N). This may provide more flexibility when the WDS 300 is gradually upgraded to eliminate the analog downlink communications signal 322. In this regard, FIG. 5 is a schematic diagram of an exemplary WDS 500 in which a plurality of remote units 502(1)-502(N) includes a plurality of signal analysis circuits 504(1)-504(N), respectively, for determining the physical characteristics 348(1)-348(M) of each of the downlink digital communications signals 306(1)-306(M). Common elements between FIGS. 3 and 5 are shown therein with common element numbers and will not be re-described herein.

With reference to FIG. 5, the signal analysis circuit 504(1) in the remote unit 302(1) is configured to determine the physical characteristics 348(1) of the downlink digital communications signal 306(1). In one non-limiting example, the signal analysis circuit 504(1) in the remote unit 302(1) may be integrated with a baseband circuit 506(1). In another non-limiting example, the signal analysis circuit 504(N) in the remote unit 302(N) may be provided outside the baseband circuit 506(N).

Figure 6:
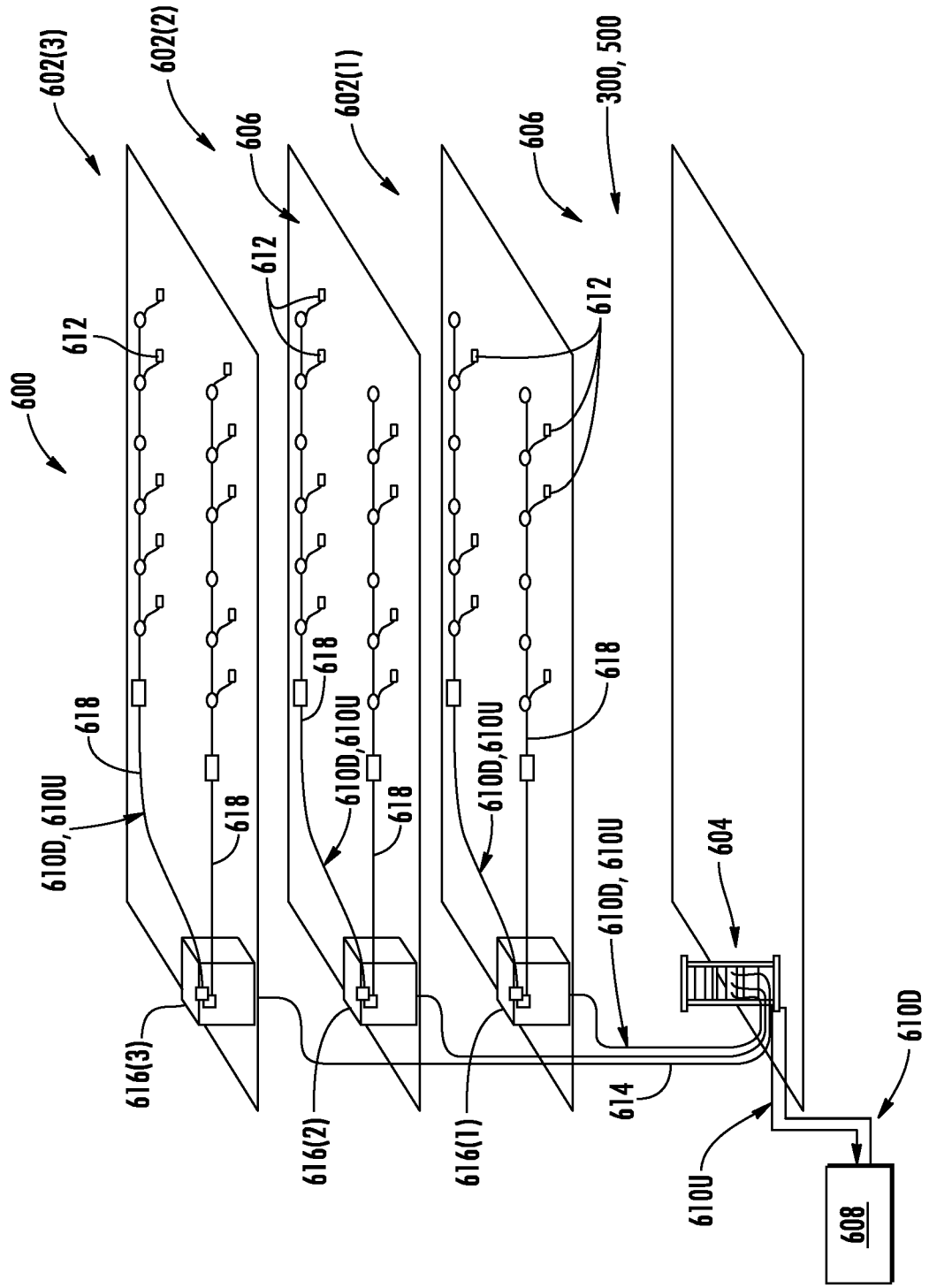
FIG. 6 is a partial schematic cut-away diagram of an exemplary building infrastructure in which WDSs configured to suppress the out-of-channel noise associated with the one or more downlink digital communications signals, including the WDSs of FIGS. 3 and 5, can be provided.

The WDS 300 of FIG. 3 and the WDS 500 of FIG. 5, which are configured to reduce the out-of-channel noise 304 in the downlink digital communications signals 306(1)-306(M), may be provided in an indoor environment, as illustrated in FIG. 6. FIG. 6 is a partial schematic cut-away diagram of an exemplary building infrastructure 600 in which WDSs configured to suppress the out-of-channel noise 304 associated with the downlink digital communications signals 306(1)-306(M), including the WDS 300 of FIG. 3 and the WDS 500 of FIG. 5, can be employed. The building infrastructure 600 in this embodiment includes a first (ground) floor 602(1), a second floor 602(2), and a third floor 602(3). The floors 602(1)-602(3) are serviced by a central unit 604 to provide antenna coverage areas 606 in the building infrastructure 600. The central unit 604 is communicatively coupled to a base station 608 to receive downlink communications signals 610D from the base station 608. The central unit 604 is communicatively coupled to a plurality of remote units 612 to distribute the downlink communications signals 610D to the remote units 612 and to receive uplink communications signals 610U from the remote units 612, as previously discussed above. The downlink communications signals 610D and the uplink communications signals 610U communicated between the central unit 604 and the remote units 612 are carried over a riser cable 614. The riser cable 614 may be routed through interconnect units (ICUs) 616(1)-616(3) dedicated to each of the floors 602(1)-602(3) that route the downlink communications signals 610D and the uplink communications signals 610U to the remote units 612 and also provide power to the remote units 612 via array cables 618.

Figure 7:
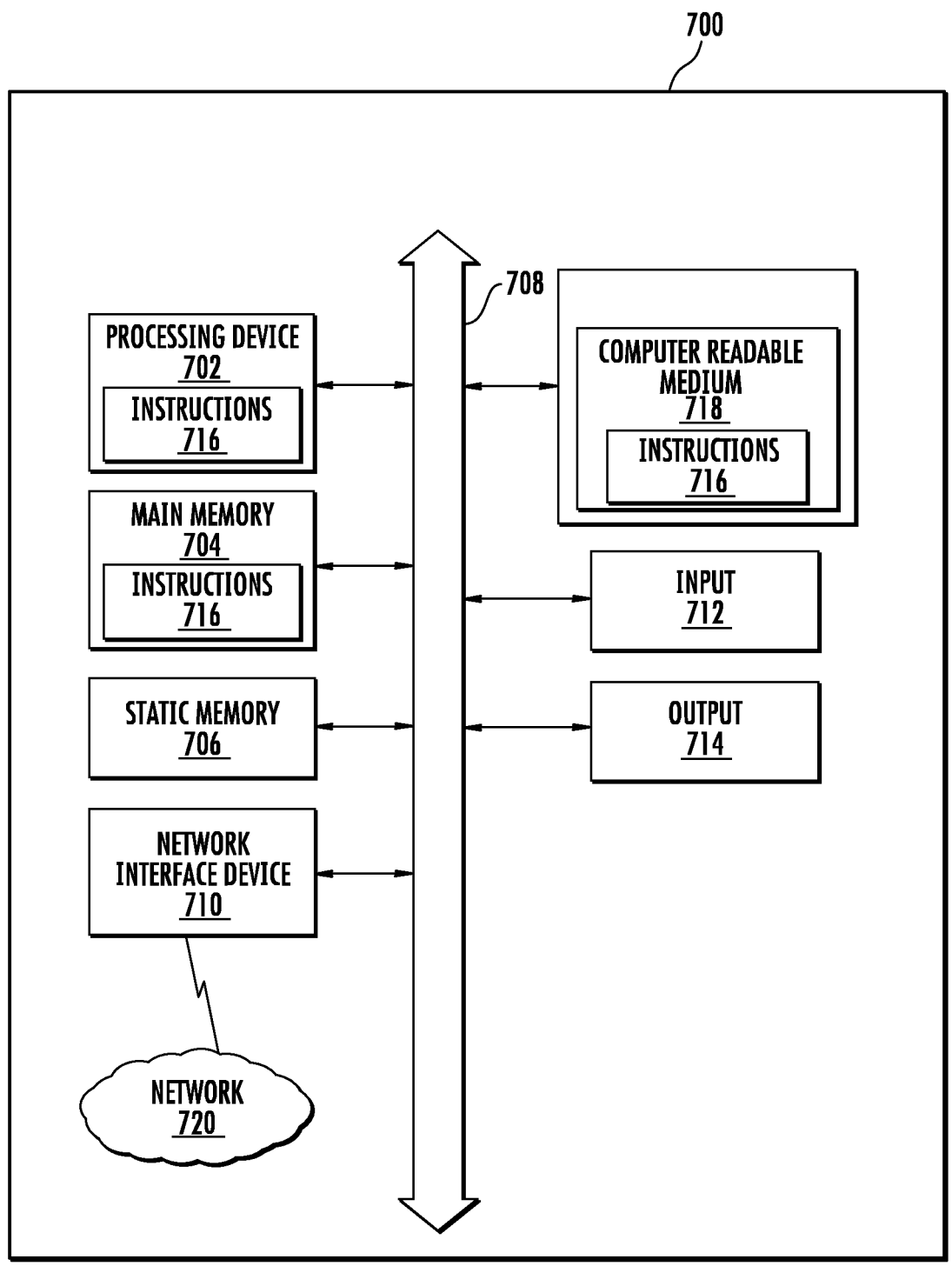
FIG. 7 is a schematic diagram representation of additional detail illustrating an exemplary computer system that could be employed in a control circuit(s) in the plurality of remote units of FIGS. 3 and 5, for reducing the out-of-channel noise associated with the one or more downlink digital communications signals.

FIG. 7 is a schematic diagram representation of additional detail illustrating an exemplary computer system 700 that could be employed in a controller, including the control circuits 344(1)-344(N) in the remote units 302(1)-302(N) of FIG. 3 and the remote units 502(1)-502(N) of FIG. 5, for reducing the out-of-channel noise 304 associated with the downlink digital communications signals 306(1)-306(M). In this regard, the computer system 700 is adapted to execute instructions from an exemplary computer-readable medium to perform these and/or any of the functions or processing described herein.

In this regard, the computer system 700 in FIG. 7 may include a set of instructions that may be executed to predict frequency interference to avoid or reduce interference in a multi-frequency DAS. The computer system 700 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 700 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 700 in this embodiment includes a processing device or processor 702, a main memory 704 (e.g., read-only memory (ROM), flash memory, dynamic random access memory (DRAM), such as synchronous DRAM (SDRAM), etc.), and a static memory 706 (e.g., flash memory, static random access memory (SRAM), etc.), which may communicate with each other via a data bus 708. Alternatively, the processor 702 may be connected to the main memory 704 and/or the static memory 706 directly or via some other connectivity means. The processor 702 may be a controller, and the main memory 704 or the static memory 706 may be any type of memory.

The processor 702 represents one or more general-purpose processing devices, such as a microprocessor, central processing unit, or the like. More particularly, the processor 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 702 is configured to execute processing logic in instructions for performing the operations and steps discussed herein.

The computer system 700 may further include a network interface device 710. The computer system 700 also may or may not include an input 712, configured to receive input and selections to be communicated to the computer system 700 when executing instructions. The computer system 700 also may or may not include an output 714, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 700 may or may not include a data storage device that includes instructions 716 stored in a computer-readable medium 718. The instructions 716 may also reside, completely or at least partially, within the main memory 704 and/or within the processor 702 during execution thereof by the computer system 700, the main memory 704 and the processor 702 also constituting computer-readable medium. The instructions 716 may further be transmitted or received over a network 720 via the network interface device 710.

While the computer-readable medium 718 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
    a central unit configured to communicate one or more downlink digital communications signals to a central unit communications interface communicatively coupled to at least one downlink communications medium; and
    a plurality of remote units, each comprising:
        a remote unit communications interface communicatively coupled to the at least one downlink communications medium to receive a downlink digital communications signal among the one or more downlink digital communications signals communicated by the central unit;
        a digital filter configured to:
            receive the downlink digital communications signal in a predefined frequency channel having a predefined bandwidth for at least one communications service; and
            output a modified downlink digital communications signal based on the downlink digital communications signal and at least one filter configuration parameter received from a control circuit configured to determine the at least one filter configuration parameter based on one or more physical characteristics of the downlink digital communications signal to suppress out-of-channel noise in the downlink digital communications signal;
        a digital-to-analog converter (DAC) configured to convert the modified downlink digital communications signal into a downlink radio frequency (RF) communications signal; and
        a power amplifier configured to generate an amplified downlink RF communications signal based on the downlink RF communications signal for communication to one or more client devices in the WDS;
    wherein the digital filter is further configured to suppress the out-of-channel noise in the downlink digital communications signal to provide for the amplified downlink RF communications signal to comply with a spectrum emission mask (SEM) for the at least one communications service.

2. The WDS of claim 1, wherein the one or more physical characteristics of the downlink digital communications signal are comprised of center frequency of the downlink digital communications signal.

3. The WDS of claim 1, wherein the one or more physical characteristics of the downlink digital communications signal are comprised of bandwidth of the downlink digital communications signal.

4. The WDS of claim 1, wherein the one or more physical characteristics of the downlink digital communications signal are comprised of power level of the downlink digital communications signal.

5. The WDS of claim 1, wherein the one or more physical characteristics of the downlink digital communications signal are comprised of communication technology of the downlink digital communications signal.

6. The WDS of claim 1, wherein the control circuit is configured to determine the at least one filter configuration parameter based on an adjacent channel power ratio (ACPR) for the downlink digital communications signal.

7. The WDS of claim 1, wherein the control circuit is further configured to control the power amplifier to generate the amplified downlink RF communications signal that complies with the SEM.

8. The WDS of claim 7, wherein the control circuit is configured to control the power amplifier based on the one or more physical characteristics of the downlink digital communications signal.

9. The WDS of claim 1, wherein the control circuit is further configured to:
    receive a feedback signal indicating power level of the amplified downlink RF communications signal; and
    adjust the at least one filter configuration parameter when the control circuit determines that the power level of the amplified downlink RF communications signal exceeds the SEM.

10. The WDS of claim 9, wherein each of the plurality of remote units further comprises the control circuit.

11. The WDS of claim 1, wherein each of the plurality of remote units further comprises:
    a baseband circuit configured to provide digital processing to the downlink digital communications signal, the baseband circuit communicatively coupled to the remote unit communications interface and the DAC;
    wherein the baseband circuit comprises the digital filter.

12. The WDS of claim 1, wherein each of the one or more downlink digital communications signals is communicated over a respective predefined frequency channel having a respective predefined bandwidth for the at least one communications service.

13. The WDS of claim 12, wherein the respective predefined frequency channel is comprised of a plurality of frequency channels.

14. The WDS of claim 12, wherein the central unit is further configured not to suppress the out-of-channel noise in the one or more downlink digital communications signals before communicating the one or more downlink digital communications signals to the central unit communications interface.

15. The WDS of claim 1, wherein the central unit comprises:
- a digital signal interface configured to receive a digital downlink communications signal from a digital signal source; and
- an analog signal interface configured to receive an analog downlink communications signal from an RF signal source.

16. The WDS of claim 15, wherein:
the digital signal source is comprised of a baseband unit (BBU); and
the RF signal source is comprised of a base transceiver station (BTS).

17. The WDS of claim 15, wherein the one or more downlink digital communications signals are comprised of the digital downlink communications signal received from the digital signal interface.

18. The WDS of claim 15, wherein the one or more downlink digital communications signals are comprised of a second digital downlink communications signal converted from the analog downlink communications signal received from the analog signal interface.

19. The WDS of claim 18, wherein the central unit further comprises an analog-to-digital converter (ADC) configured to convert the analog downlink communications signal into the second digital downlink communications signal.

20. The WDS of claim 15, wherein the control circuit is further configured to receive the one or more physical characteristics of the downlink digital communications signal among the one or more downlink digital communications signals from at least one signal analysis circuit.

21. The WDS of claim 20, wherein the at least one signal analysis circuit is communicatively coupled to the central unit communications interface in the central unit to determine the one or more physical characteristics of each of the one or more downlink digital communications signals.

22. The WDS of claim 20, wherein the at least one signal analysis circuit is communicatively coupled to the digital signal interface in the central unit to determine the one or more physical characteristics of the digital downlink communications signal received from the digital signal interface.

23. The WDS of claim 20, wherein the at least one signal analysis circuit is configured to provide the one or more physical characteristics of each of the one or more downlink digital communications signals to the control circuit over the at least one downlink communications medium.

24. The WDS of claim 20, wherein the at least one signal analysis circuit is comprised of a plurality of signal analysis circuits, wherein the plurality of signal analysis circuits is provided in the plurality of remote units, respectively.

25. The WDS of claim 1, wherein the at least one downlink communications medium is comprised of at least one optical fiber-based downlink communications medium.

26. The WDS of claim 25, wherein the central unit comprises an electrical-to-optical (E/O) converter configured to:
- convert the one or more downlink digital communications signals into one or more optical downlink digital communications signals; and
- provide the one or more optical downlink digital communications signals to the central unit communications interface.

27. The WDS of claim 26, wherein each of the plurality of remote units further comprises an optical-to-electrical (O/E) converter configured to:
- receive an optical downlink digital communications signal among the one or more optical downlink digital communications signals from the remote unit communications interface; and
- convert the optical downlink digital communications signal into the downlink digital communications signal.

* * * * *